US009260599B2

(12) United States Patent
Buehler et al.

(10) Patent No.: US 9,260,599 B2
(45) Date of Patent: Feb. 16, 2016

(54) PROCESS FOR PREPARING EXPANDED COPOLYMERS BASED ON POLY(METH)ACRYLIMIDE COMPRISING AN ADHESION PROMOTER

(71) Applicant: EVONIK ROEHM GMBH, Darmstadt (DE)

(72) Inventors: Sebastian Buehler, Darmstadt (DE); Arnim Kraatz, Darmstadt (DE); Ina Piotrowski, Griesheim (DE); Kay Bernhard, Darmstadt (DE)

(73) Assignee: EVONIK ROEHM GmbH, Darmstadt (DE)

( * ) Notice: Subject to any disclaimer, the term of this patent is extended or adjusted under 35 U.S.C. 154(b) by 128 days.

(21) Appl. No.: 14/353,149

(22) PCT Filed: Sep. 25, 2012

(86) PCT No.: PCT/EP2012/068885
§ 371 (c)(1),
(2) Date: Apr. 21, 2014

(87) PCT Pub. No.: WO2013/056947
PCT Pub. Date: Apr. 25, 2013

(65) Prior Publication Data
US 2014/0309361 A1  Oct. 16, 2014

(30) Foreign Application Priority Data

Oct. 21, 2011   (DE) .......................... 10 2011 085 026

(51) Int. Cl.

| | |
|---|---|
| *C08L 33/24* | (2006.01) |
| *C08J 9/00* | (2006.01) |
| *C08J 9/236* | (2006.01) |
| *B29C 44/34* | (2006.01) |
| *C08J 9/02* | (2006.01) |
| *C08J 9/24* | (2006.01) |
| *B29K 33/00* | (2006.01) |
| *B29K 75/00* | (2006.01) |
| *B29C 44/12* | (2006.01) |
| *B29L 31/30* | (2006.01) |

(52) U.S. Cl.
CPC ............. *C08L 33/24* (2013.01); *B29C 44/3461* (2013.01); *C08J 9/0061* (2013.01); *C08J 9/02* (2013.01); *C08J 9/236* (2013.01); *C08J 9/24* (2013.01); *B29C 44/1228* (2013.01); *B29C 44/3415* (2013.01); *B29K 2033/08* (2013.01); *B29K 2033/12* (2013.01); *B29K 2075/00* (2013.01); *B29L 2031/30* (2013.01); *C08J 2203/12* (2013.01); *C08J 2333/24* (2013.01); *C08J 2433/08* (2013.01); *C08J 2477/00* (2013.01)

(58) Field of Classification Search
None
See application file for complete search history.

(56) References Cited

U.S. PATENT DOCUMENTS

| | | | |
|---|---|---|---|
| 3,627,711 A | 12/1971 | Schroeder et al. | |
| 3,906,137 A * | 9/1975 | Bauer | B29C 44/5654 156/196 |
| 5,112,663 A * | 5/1992 | Morenz | B29C 44/1209 156/213 |
| 2007/0077442 A1* | 4/2007 | Scherble | B32B 5/18 428/473.5 |
| 2013/0041056 A1* | 2/2013 | Geyer | C08J 9/0038 521/85 |
| 2013/0108817 A1 | 5/2013 | Bernhard et al. | |
| 2013/0281561 A1 | 10/2013 | Bernhard et al. | |

FOREIGN PATENT DOCUMENTS

| | | | | |
|---|---|---|---|---|
| DE | 18 17 156 | | 7/1970 | |
| DE | 102 17 005 | | 9/2003 | |
| DE | 102 56 816 | | 3/2004 | |
| GB | 2134845 A | * | 8/1984 | .............. B29C 44/16 |
| WO | WO 2011/138060 | * | 11/2011 | ................ C08J 9/00 |

OTHER PUBLICATIONS

International Search Report issued Feb. 4, 2013, in PCT/EP12/068885, filed Sep. 25, 2012.

* cited by examiner

*Primary Examiner* — Kara Boyle
(74) *Attorney, Agent, or Firm* — Oblon, McClelland, Maier & Neustadt, L.L.P.

(57) ABSTRACT

The invention describes a method for producing a foam molding from poly(meth)acrylimide, an adhesion promoter or an adhesion promoter mixture and optional auxiliaries, comprising the following steps:
  grinding a polymeric molding made of poly(meth)acrylamide,
  coating the grindings obtained in the preceding step with an adhesion promoter,
  introducing the coated grindings into a mold,
  optionally adding the auxiliaries,
  heating the mold,
  cooling the mold below the foaming temperature, and
  demolding the foam molding.
The resulting foam molding has outstanding mechanical properties and is suitable for applications including as a component in the production of space, air, water and land vehicles.

12 Claims, No Drawings

PROCESS FOR PREPARING EXPANDED COPOLYMERS BASED ON POLY(METH)ACRYLIMIDE COMPRISING AN ADHESION PROMOTER

CROSS REFERENCE TO RELATED APPLICATIONS

The present application is a 35 U.S.C. §371 national stage patent application of International patent application PCT/EP2012/068885, filed on Sep. 25, 2012, published as WO/2013/056947 on Apr. 25, 2013, the text of which is incorporated by reference, and claims the benefit of the filing date of German application no. 10 2011 085 026.0, filed on Oct. 21, 2011, the text of which is also incorporated by reference.

FIELD OF THE INVENTION

The invention relates to a method for producing expanded copolymers based on methacrylic and acrylic compounds with good grain boundary adhesion and to the attachment of various outer layers of plastics and/or metals and/or fibre-plastic composites on the resultant foam core.

PRIOR ART

ROHACELL® is a foam with diverse possible uses which is commercialized by Evonik Röhm GmbH.

DE 27 26 260 (Röhm GmbH) describes the production of poly(meth)acrylimide foams (PMI foams) which have excellent mechanical properties even at high temperatures. The foams are produced in a casting process, i.e. the monomers and required adjuvants are mixed and the mixture is polymerized in a chamber. In a second step, the polymer is foamed by heating. A disadvantage of the foams described in DE 27 26 260 is their course pore structure. The pore size can be lowered considerably just by varying the blowing agents.

Producing PMI foams with even smaller pores has been accomplished through the use of insoluble nucleating agents (DE 10 21 22 35.0, Röhm GmbH). The use of insoluble nucleating agents in the casting process, however, entails considerable extra production cost and complexity. The comonomer mixture for polymerization has a density of only around 0.8 g/cm$^3$. Substances contemplated as nucleating agents, such as silicon dioxide, zinc sulphide, and sodium or potassium chloride, for example, have higher densities than the monomer mixture and are therefore immediately deposited. A foam of a uniform pore structure is obtainable only if the deposition of the nucleating agent is prevented. For this purpose, it is necessary to add anti-settling agents, such as Aerosil and carbon blacks, for example, or thickeners, such as soluble polymers of high molecular mass, to the monomer mixture and to incorporate them into the mixtures together with the nucleating agent, which is a costly and inconvenient process.

Fine-pored foams based on PMI have also been described in EP 532 023 (Röhm GmbH). The process described therein, however, has various, grave, disadvantages. The polymerization uses relatively high initiator concentrations, and so the resulting polymer, despite being produced by a casting process, has a weight-average molecular weight only in the range of 50-500 kDa. Furthermore, no crosslinker was added to the formula. For these reasons, the resulting foams have a low heat distortion resistance and poor creep characteristics.

Fine-pore foams are known and are marketed under the name ROHACELL® by Evonik Röhm GmbH. Fine pores are achievable by varying blowing agents or by adding insoluble nucleating agents. A problem, however, is that the level of fine porosity achieved by varying the blowing agents is not always enough. Materials of greater fine porosity can be produced using insoluble nucleating agents, but the latter necessitate the use of anti-settling agents, which entails increased cost and complexity in the production process.

Poly(meth)acrylimides with a high heat distortion resistance can be obtained by reacting polymethyl(meth)acrylate or copolymers thereof with primary amines. The numerous examples of this polymer-analogous imidation may be represented by the following references: U.S. Pat. No. 4,246,374 (Rohm & Haas), EP 216 505 A2 (Rohm & Haas), EP 860 821 (Saint Gobain Vitrage). High heat distortion resistance can be achieved here either through use of arylamines (JP 05222119 A2, Mitsubishi Rayon) or through the use of specific comonomers (EP 561 230 (BASF AG), EP 577 002 A1 (BASF AG)). None of these reactions, however, produces foams, instead producing solid polymers which in order to give a foam would have to be foamed in a separate, second step.

Poly(meth)acrylimide foams are well-established (see e.g. DE-C 27 26 260 (Röhm GmbH)). On account of their high heat distortion resistance, their good compressive strength and their low weight, they find broad application, for example, as core material for laminate materials or foam composites (cf. DE-C 28 22 885 (Röhm GmbH), DE-A 33 04 882 (Röhm GmbH), U.S. Pat. No. 4,316,934 (Röhm GmbH)).

DE 3 630 930 (Röhm GmbH) describes a further method for the foaming of the abovementioned copolymer boards made from methacrylic acid and methacrylonitrile. In this case, the boards are induced to foam by means of a microwave field, this therefore being referred to below as the microwave process. In this process it is necessary to bear in mind that the board for foaming, or at least its surface, must be heated beforehand to or above the softening point of the material. Since, of course, under these conditions there is also foaming of the material softened by the external heating, the foaming procedure cannot be controlled solely by the influence of a microwave field, but must instead also be controlled by concomitant heating from outside. Added to the normal single-stage hot-air process, therefore, is a microwave field, in order to accelerate foaming. The microwave process, however, has proved to be too complicated and therefore not relevant in practice, and to date has not been employed.

WO 90/2621 (Röhm GmbH) describes a foam of methacrylic acid and methacrylonitrile in which acrylamide comonomer prevents precipitation prematurely during the polymerization. The foam formed is very uniform, and the product has no internal stresses.

DE 197 17 483 (Röhm GmbH) describes a method for producing polymethacrylimide foams which are admixed with 1-5% by weight of MgO, based on the monomer mixture. This gives foams having significantly improved thermomechanical properties.

DE 19 925 787 (Röhm GmbH) describes a method for producing loudspeaker membranes by laminating an outer layer to a ROHACELL® foam element. The outer layer is used for increasing the strength. Lamination takes place in a press at temperatures above 160° C. and pressures >0.4 MPa. Nothing is said about the mechanical properties of the polymeric foam moulding on its own, without the laminated-on outer layer.

DE 196 06 530 (Röhm GmbH) describes the addition of flame retardant to polymethacrylimide foams.

Mechanically stable PMI foams crosslinked with allyl methacrylate are found in EP 356 714 (Röhm GmbH). The radical initiator used is azobisisobutyronitrile, for example, and the mixture for polymerization is admixed with 0.1%-10% by weight of electrically conducting particles. These foams as well, which are very solid, exhibit very little elongation at break. The same applies to the PMI foams crosslinked ionically with metal salts that are disclosed in JP 2006 045532.

Fine-pore foams with crosslinker are likewise known and are found in EP 1 678 244 (Röhm GmbH). These fine-pore materials may have an elongation at break of up to 5.5%. It is possible to achieve fine porosity by varying blowing agents or by adding insoluble nucleating agents. Materials with greater fine porosity can be produced using insoluble nucleating agents, but the latter necessitate the use of anti-settling agents, a use which is accompanied by increased cost and complexity in the production process. Overall, however, there is no description of small-pore foams with tensile strengths greater than 5.5%.

EP 1 175 458 (Röhm GmbH) describes the production of thick slabs in an isothermal regime. This is achieved through the use of at least 4 different initiators. The initiator described which is active at the highest temperature has a half-life of 1 hour at 115° C. to 125° C. and has its primary activity during thermal conditioning, but not during foaming.

Foams based on methacrylic acid and acrylonitrile are described for example in CN 100420702C.

Alternatively it is possible additionally to use at least 2 initiators which decompose at high temperatures, having a half-life of 1 hour at 60° C. to 100° C. or 100° C. to 140° C. This method, however, cannot be transposed to acid-containing systems or systems that are to be foamed.

DE 18 17 156 (Röhm GmbH) describes the preparation of foamable moulding compounds from a mixture of methacrylonitrile, methacrylic acid and formamide, urea or monomethylformamide as blowing agent in board form, by the polymerization of mixtures of methacrylonitrile and methacrylic acid between two glass plates which are sealed with a flexible cord. Also present are radical initiators, in the form of a two-component mixture of tert-butyl perpivalate and benzoyl peroxide, for example. Foamable moulding compounds foamed are plastics mouldings, such as pellets, for example, which are obtained by grinding a compact plastics moulding, or beads obtainable by bead polymerization. A multi-stage foaming method without the use of adhesion promoters is described; mechanical or chemical properties of the foam elements are not disclosed.

Object

An object of the present invention was to provide a new method for the in-mould foaming of copolymers based on methacrylic compounds and acrylic compounds. The method is intended in particular to result in a foam having particularly good grain boundary adhesion.

A more particular object of the present invention was to provide a method for producing said foams, featuring very good attachment of outer layers of plastics and/or metals and/or fibre-plastic composites on the resultant foam core.

Achievement

The objects have been achieved by means of an innovative method for producing a foam moulding from poly(meth)acrylimide, an adhesion promoter or an adhesion promoter mixture and optional auxiliaries, comprising the following steps:
  grinding a polymeric moulding made of poly(meth)acrylimide,
  coating the grindings obtained in the preceding step with an adhesion promoter,
  introducing the coated grindings into a mould,
  optionally adding the auxiliaries,
  heating the mould,
  cooling the mould below the foaming temperature, and
  demoulding the foam moulding.

In accordance with the invention there are two versions of the method: a one-stage method and a two-stage method.

The one-stage method comprises the following steps:
  grinding a polymeric moulding made of poly(meth)acrylimide,
  coating the grindings obtained in the preceding step with an adhesion promoter,
  introducing the coated grindings into a mould,
  optionally adding the auxiliaries,
  heating the mould,
  cooling the mould below the foaming temperature, and
  demoulding the foam moulding.

The two-stage method comprises the following steps:
  grinding a polymeric moulding made of poly(meth)acrylimide,
  pre-foaming the grindings,
  coating the grindings obtained in the preceding step with an adhesion promoter,
  introducing the coated grindings into a mould,
  optionally adding the auxiliaries,
  heating the mould,
  cooling the mould below the foaming temperature, and
  demoulding the foam moulding.

It is possible here with preference to use polyamides as adhesion promoters. These are used more particularly in amounts of 1% to 20% by weight, preferably of 1% to 15% by weight and more preferably of 1% to 10% by weight, based on the grindings.

It is possible with equal preference to use poly(meth)acrylates as adhesion promoters. These are used more particularly in amounts of 1% to 20% by weight, preferably of 1% to 15% by weight and more preferably of 1% to 10% by weight, based on the grindings.

The essential advantages associated with the production of foam components from copolymer grindings with adhesion promoter are as follows:
  ease of metering of the grindings in the mould in conjunction with the adhesion promoter,
  the grindings can be positioned at the appropriate location in the mould (at an angle, for example) by immediate melting of the adhesion promoter,
  production of attachment between grain boundaries/connecting seams in the foam core,
  precise and smooth imaging of the mould surface on the foam core,
  optimized production of adhesion between foam core and a corresponding matrix of the outer layers (e.g., thermoplastic, thermosetting or metallic).

In order to produce a homogeneous foam element from polymer grindings on an expandable methacrylic and acrylic basis, with adhesion promoter, first the grindings are weighed off from the corresponding polymer, in order to achieve a desired density in relation to the mould volume. Thereafter the grindings are wetted with the solid or liquid adhesion promoter or with mixtures of solid and liquid adhesion promoters, by the mixing of the two materials. The adhesion promoters wet the ground grain partly or entirely and form a more or less continuous layer around the grain.

The grain size of the grindings is between 1.5 mm and 5 mm, preferably between 2 mm and 4 mm and very preferably between 2.5 mm and 3.5 mm. The grain sizes are determined by screening with sieves having mesh sizes of 5 mm, 3 mm, 1.5 mm and 1 mm.

The grindings are produced, for example, in a cutting mill. This mill possesses two stator blades and two rotor blades in a vertical arrangement. The speed of the rotor is 50 revolutions/min, and the electrical power of the motor is 1.5 kW. With the cutting mill (manufacturer: Siemens, model 132S), the throughput is, for example, about 1 kg/hour to 1.5 kg/hour.

The amount of the pulverulent adhesion promoter, for example, that is added is 1% to 20% by weight of the grindings, preferably 1% to 15% by weight of the grindings and very preferably 1% to 10% by weight of the grindings. The adhesion promoter ensures that in the melted state, the polymer particles to be foamed slide past one another and past the walls of the mould.

After that, the solids mixture is scattered uniformly into the mould. The form of the mould may be of any desired complexity, though it should be borne in mind that thicknesses below about 3 mm no longer have good foamability properties.

After that, the mould is closed and is heated in an oven, heatable press, or otherwise. The wetted polymer foams in the course of this operation, and the adhesion promoter melts. A layer of adhesion promoter forms around the foaming polymer, causing the grain boundaries to coalesce during foaming.

The Polymer

The wording "(meth)acrylic acid" stands for methacrylic acid, acrylic acid or mixtures of both. The wording "(meth)acrylonitrile" stands for methacrylonitrile, acrylonitrile or mixtures of both. Similar comments apply in respect of a wording such as "alkyl(meth)acrylate". This stands for the alkyl esters of methacrylic acid, of acrylic acid or of mixtures of both.

For the production of the cast polymer, first of all monomer mixtures are prepared which comprise (meth)acrylic acid and (meth)acrylonitrile, preferably in a molar ratio of between 2:3 and 3:2, as principal constituents. Additionally it is possible to use further comonomers, such as esters of acrylic or methacrylic acid, styrene, maleic acid or itaconic acid or their anhydrides, or vinylpyrrolidone, for example. The fraction of the comonomers in this case ought not to be more than 30% by weight, preferably not more than 10% by weight, of the two principal constituents. Small amounts of crosslinking monomers, such as allyl acrylate, for example, may be used as well. The amounts, however, ought preferably to be not more than 0.05% to 2.0% by weight.

The mixture for the copolymerization further comprises blowing agents, which either decompose or evaporate at temperatures of about 150 to 250° C. and form a gas phase in so doing.

Polymerization takes place usefully in a slab mould. For the production of flat slabs, in layers with thicknesses of up to 80 mm, for example, the monomer mixture is sited between two glass plates which are sealed at the respective margin and form a kind of flat chamber. This flat chamber is surrounded by a waterbath, which is set to the desired polymerization temperature.

The polymerization can be carried out largely or over wide areas under isothermal conditions, i.e. with a constant waterbath temperature. In many cases it is possible to keep the waterbath temperature constant from the start to the end of the polymerization. Optionally, however, it is also possible to keep the waterbath temperature constant for a long time to start with and to increase it after a certain time in order to carry out part of the polymerization at a higher temperature.

In this subsequent polymerization phase as well, carried out at a higher temperature, the waterbath temperature can be kept constant.

The selected waterbath temperature is dependent on the thickness of the polymerization chamber and on the formula used in the polymerization. In this context it is generally advantageous to shift the polymerization temperature and hence also the temperature of the waterbath towards lower levels as the thickness of the board to be produced goes up.

The appropriate temperature for formula and thickness can be optimized in each case by means of simple preliminary tests.

It is a given that the temperature is set for the thickness of the chamber and for the formula, within the limits set out above, in such a way that the heat which is given off during the polymerization can be removed sufficiently without unwanted temperatures occurring in the polymerization mixture during the polymerization. After the end of the polymerization process, which is controlled by the surrounding waterbath, thermal conditioning is carried out in a heating cabinet. Thermal conditioning takes place in general at temperatures of 80 to 130° C., and here, as already stated, it is possible to set a temperature regime which rises steadily or in steps, beginning at 38° C., preferably beginning at the polymerization temperature. Generally speaking, 10 to 1000 hours are sufficient for this final polymerization in the thermal conditioning cabinet.

The Blowing Agents

Blowing agents (C) which can be used are the following compounds or mixtures thereof: formamide, formic acid, urea, itaconic acid, citric acid, dicyandiamide, water, monoalkylureas, dimethylurea, 5,5'-azobis(5-ethyl-1,3-dioxane), 2,2'-azobis(N-butylisobutyramide), 2,2'-azobis(N-diethylisobutyramide), 2,2',4,4,4',4'-hexamethyl-2,2'-azopentane, 2,2'-azobis-2-methylpropane, dimethyl carbonate, di-tert-butyl carbonate, acetone cyanohydrin carbonate, methyl hydroxyisobutyrate carbonate, N-methylurethane, N-ethylurethane, N-tert-butylurethane, urethane, oxalic acid, maleic acid, hydroxyisobutyric acid, malonic acid, cyanoformamide, dimethylmaleic acid, tetraethyl methanetetracarboxylate, N-butyl oxamate, trimethyl methanetricarboxylate, triethyl methanetricarboxylate, and also monohydric alcohols with 3 to 8 carbon atoms such as, for example, propan-1-ol, propan-2-ol, butan-1-ol, butan-2-ol, tert-butanol and isobutanol.

The Initiators

Initiators used are compounds and initiator systems which are able to set radical polymerizations under way. Known classes of compound are peroxides, hydroperoxides, peroxodisulphates, percarbonates, perketals, peroxyesters, hydrogen peroxide and azo compounds. Examples of initiators are hydrogen peroxide, dibenzoyl peroxide, dicyclohexyl peroxodicarbonate, dilauryl peroxide, methyl ethyl ketone peroxide, acetylacetone peroxide, di-tert-butyl peroxide, tert-butyl hydroperoxide, cumene hydroperoxide, tert-butyl peroctanoate, tert-butyl per-2-ethylhexanoate, tert-butyl perneodecanoate, tert-amyl perpivalate, tert-butyl perpivalate, tert-butyl perbenzoate, lithium peroxodisulphate, sodium peroxodisulphate, potassium peroxodisulphate and ammonium peroxodisulphate, azoisobutyronitrile, 2,2-azobis(iso-2,4-dimethylvaleronitrile), 2,2-azobis(isobutyronitrile), 2,2'-azobis(2-amidinopropane)dihydrochloride, 2-(carbamoylazo)isobutyronitrile and 4,4'-azobis(cyanovaleric acid).

Likewise suitable are redox initiators (H. Rauch-Puntigam, Th. Völker, Acryl- und Methacrylverbindungen, Springer, Heidelberg, 1967 or Kirk-Othmer, Encyclopaedia of Chemical Technology, Vol. 1, pages 286 ff, John Wiley & Sons, New York, 1978). It may be advantageous to combine initiators and initiator systems having different decomposition properties in terms of time and temperature. The initiators are used preferably in amounts of 0.01% to 2% by weight, more preferably of 0.15% to 1.5% by weight, based on the total weight of the monomers.

The polymerization takes place preferably by way of versions of bulk polymerization, such as, for example, the process known as the chamber process, without being limited to this.

The weight-average molecular weight $\overline{M}_w$ of the polymers is preferably greater than $10^6$ g/mol, more particularly greater than $3 \times 10^6$ g/mol, without any intention that this should constitute a restriction.

Furthermore, the precursors may comprise customary additives. These include, among others, antistats, antioxidants, demoulding agents, lubricants, dyes, flame retardants, flow improvers, fillers, light stabilizers and organic phosphorus compounds, such as phosphites or phosphonates, pigments, weathering protectants and plasticizers.

Conductive particles which prevent electrostatic charging of the foams are another class of preferred additives. These include, among others, metal particles and carbon-black particles, which may also be present in the form of fibres, having a size in the range from 10 nm to 10 mm, as is described in EP 0 356 714 A1.

One especially preferred poly(meth)acrylimide foam which can be used may be obtained, for example, by the following steps:

1. Production of a polymer board by radical polymerization of a composition consisting of
   (a) a monomer mixture of 20% to 60% by weight of methacrylonitrile, 80% to 40% by weight of methacrylic acid and optionally up to 20% by weight, based on the sum of methacrylic acid and methacrylonitrile, of further monofunctional, vinylically unsaturated monomers,
   (b) 0% to 15% by weight of a blowing agent mixture of formamide or monomethylformamide and a monohydric aliphatic alcohol having 3-8 carbons atoms in the molecule, such as isopropanol, for example,
   (c) a crosslinker system consisting of
      (c.1) 0.005% to 5% by weight of a radically polymerizable, vinylically unsaturated compound having at least 2 double bonds in the molecule, and
      (c.2) 0.1% to 5% by weight of magnesium oxide, dissolved in the monomer mixture,
   (d) an initiator system,
   (e) customary additives
2. This mixture is polymerized over several days at 30° C. to 45° C. in a chamber which is formed from two glass plates measuring 50 cm*50 cm and from an edge seal which is 2.2 cm thick. For the final polymerization to form poly(meth)acrylimide, the polymer is subsequently subjected to a thermal conditioning program ranging from 40° C. to 130° C. for about 20 hours. The subsequent foaming takes place over several hours at 200° C. to 250° C.

Optional Additives for Poly(Meth)Acrylimides

The mixtures may further be admixed with customary additives. Suitable amounts are, for example, 0% to 20% by weight, 0% to 10% by weight or 0% to 5% by weight, based on the monomer mixture.

The customary additives are different from the stated monomers, crosslinkers, blowing agents or initiators.

They include, among others, antistats, antioxidants, demoulding agents, lubricants, dyes, flow improvers, fillers, light stabilizers and organic phosphorus compounds, such as phosphites or phosphonates, pigments, release agents, weathering protectants and plasticizers. Further possible additions are flame retardants. As well as halogen-containing flame retardants, some of which contain antimony oxides, it is also possible to use phosphorus-containing compounds. Phosphorus-containing compounds are preferred on account of the reduced smoke-gas toxicity in the event of fire. The phosphorus compounds include, among others, phosphanes, phosphane oxides, phosphonium compounds, phosphonates, phosphites and/or phosphates. These compounds may be organic and/or inorganic in nature, such as, for example, phosphoric monoesters, phosphonic monoesters, phosphoric diesters, phosphonic diesters and phosphoric triesters and also polyphosphates.

The Adhesion Promoter

In principle the adhesion promoters may be liquid or solid, and it is also possible to use mixtures of solid adhesion promoters with one another, of solid and liquid adhesion promoters with one another and of liquid adhesion promoters with one another.

It is possible, for example, to use hot-melt adhesives or reactive adhesives; the adhesion promoters in these cases may be based on different types of polyamide (PA) (e.g. PA 6 (Vestamelt® products, sold by Evonik Degussa GmbH), PMMA (e.g. Degalan® BM310, sold by Evonik Röhm GmbH), PMMI (Acrymid® TT50, sold by Evonik Röhm GmbH (Acrymid® TT50 is a poly(n-methylmethacrylimide) with high heat distortion resistance)) or curing agents (Vestamin®, sold by Evonik Degussa GmbH (Vestamin® is a crosslinker based on aliphatic and cycloaliphatic amines))).

The adhesion promoter may optionally consist of a mixture of the aforementioned constituents.

The melting temperature of the adhesion promoters is between 120 degrees Celsius and 255 degrees Celsius, preferably between 120 degrees Celsius and 250 degrees Celsius and very preferably between 120 degrees Celsius and 245 degrees Celsius.

The amount of adhesion promoter or adhesion promoter mixture, based on the poly(meth)acrylimide polymer, is between 1% and 20% by weight, preferably between 1% and 15% by weight and very preferably between 1% and 10% by weight.

Optionally it is possible additionally to use the customary demoulding assistants and/or release agents; additionally, the mould may be provided with non-stick coatings.

Procedure

Production of Mould-Foamed Materials

The following parameters were used for all of the foaming operations:
- the pressure p is about 3 to 4 MPa and serves for fixing and closing the mould
- the temperature T is about 240 degrees Celsius to 250 degrees Celsius
- the foaming time is about 1½ hours, or about 30 minutes in the case of pre-foamed material.

Compression Test

The compression test took place in accordance with DIN EN ISO 844.

The specimens are mould-foamed and are then sawn to the required test dimensions of 50 mm×50 mm×50 mm. The specimens are conditioned at 125 degrees Celsius for 2 hours. Compressive strength is tested using a Z 030 testing machine from Zwick/Roell.

Because of the characteristics of the material the compressive stress at 10% deformation is determined for mould-foamed material; for ROHACELL®, the compressive strength is determined, since in this case there is a clear fracture in one cell plane.

Tensile Test

The tensile test took place along the lines of DIN EN ISO 527-2.

In deviation from that standard, the specimens were produced by machining of mould-foamed boards. The specimens (type 1B) are milled from ROHACELL® board blanks and mould-foamed boards and have a thickness of 10 mm. The specimens are conditioned at 125 degrees Celsius for 2 hours. The tensile strength is tested using a Z 030 testing machine from Zwick/Roell.

Results

For the same densities, the inventive material achieves about 50% of the compressive strength of ROHACELL® RIMA.

The adhesion promoter VESTAMELT® (5% by weight, based on the grindings employed) improves the compressive strength by 15%; the adhesion promoter DEGALAN® BM310 (5% by weight, based on the grindings employed) improves the compressive strength by 8%.

The inventive material achieves about 30% of the tensile strength of ROHACELL® RIMA, and 15% of the elongation at break. The modulus of elasticity is about 85% of the value for ROHACELL® RIMA 110.

The adhesion promoter VESTAMELT® (5% by weight, based on the grindings employed) increases the tensile strength and the elongation at break by about 35% and the modulus of elasticity by about 5%; the adhesion promoter DEGALAN® BM310 (5% by weight, based on the grindings employed) improves the tensile strength, the modulus of elasticity and the elongation at break by less than 5%.

Two-Stage Foaming

In order to minimize the process times, the possibility was tested of fully foaming out a mould with grindings which have already been pre-foamed. Therefore, different pre-foaming temperatures, of between 170° C. and 190° C., for example, and pre-foaming times, of between 60 minutes and 90 minutes, for example, and also different temperatures, of between 230° C. and 250° C., for example, and times, of between 10 minutes and 40 minutes, for example, for foaming to completion in the mould were tested.

The essential difference relative to the one-stage foaming is that the grindings are already pre-foamed before the IMF procedure. For this purpose, the calculated quantity of grindings needed for the cavity is stored in the preheated forced-air oven at a temperature between 175° C. and 185° C. for about 1 hour. As a result of the onset of foaming, the volume of the grindings increases by two to three times. This is accompanied by a whitish to yellowish coloration. The pre-foamed material is distributed in the cavity, as is also done for the grindings. Under the same conditions as for the one-stage foaming, apart from the process time, a foam element is produced. As a result of the pre-foaming, the process time is reduced. For foaming to completion a foaming time of t=20-30 minutes is used. Cooling takes place in the same way as for the one-stage process.

The two-stage foaming is intended in particular to allow a reduction in the cycle time, so that material can be placed in interim storage for a longer time and shorter cycle times for the production of foam cores can be ensured.

The foam moulding obtainable in accordance with the invention is a suitable material component for the production of space, air, water and land vehicles.

The invention claimed is:

1. A method for producing a foam molding from poly(meth)acrylimide, an adhesion promoter or an adhesion promoter mixture and optional auxiliaries, the method comprising:
   grinding a polymeric molding comprising poly(meth)acrylimide, to obtain grindings,
   coating the grindings with an adhesion promoter, to obtain coated grindings,
   introducing the coated grindings into a mold,
   optionally adding auxiliaries to the mold,
   heating the mold to form a foam molding,
   cooling the mold below a foaming temperature, and
   demolding the foam molding.

2. The method of claim 1, further comprising pre-foaming the grindings before coating the grindings.

3. The method of claim 1, wherein the adhesion promoter comprises a polyamide.

4. The method of claim 1, wherein the adhesion promoter comprises a poly(meth)acrylate.

5. The method of claim 1, wherein the adhesion promoter comprises a polyamide in an amount of 1% to 20% by weight, based on a weight of the grindings.

6. The method of claim 1, wherein the adhesion promoter comprises a polyamide in an amount of 1% to 15% by weight, based on a weight of the grindings.

7. The method of claim 1, wherein the adhesion promoter comprises a polyamide in an amount of 1% to 10% by weight, based on a weight of the grindings.

8. The method of claim 1, wherein the adhesion promoter comprises a poly(meth)acrylate in an amount of 1% to 20% by weight, based on a weight of the grindings.

9. The method of claim 1, wherein the adhesion promoter comprises a poly(meth)acrylate in an amount of 1% to 15% by weight, based on a weight of the grindings.

10. The method of claim 1, wherein the adhesion promoter comprises a poly(meth)acrylate in an amount of 1% to 10% by weight, based on a weight of the grindings.

11. The method of claim 1, comprising adding the auxiliaries to the mold.

12. The method of claim 2, comprising adding the auxiliaries to the mold.

* * * * *